(12) United States Patent
Cho (10) Patent No.: US 9,765,801 B2
(45) Date of Patent: Sep. 19, 2017

(54) DEVICE FOR LOCKING ROD MEMBER USING LOCK BLOCK

(71) Applicant: Korea Pneumatic System Co., Ltd., Seoul (KR)

(72) Inventor: Ho-Young Cho, Seoul (KR)

(73) Assignee: KOREA PNEUMATIC SYSTEM CO., LTD., Seoul (KR)

( * ) Notice: Subject to any disclaimer, the term of this patent is extended or adjusted under 35 U.S.C. 154(b) by 149 days.

(21) Appl. No.: 14/841,330

(22) Filed: Aug. 31, 2015

(65) Prior Publication Data

US 2016/0076563 A1 Mar. 17, 2016

(30) Foreign Application Priority Data

Sep. 11, 2014 (KR) ........................ 10-2014-0120216

(51) Int. Cl.
| | |
|---|---|
| F15B 15/26 | (2006.01) |
| G05G 5/22 | (2006.01) |
| F16B 7/14 | (2006.01) |
| F04F 99/00 | (2009.01) |
| F16B 47/00 | (2006.01) |

(52) U.S. Cl.
CPC ............ *F15B 15/262* (2013.01); *F04F 99/00* (2013.01); *F15B 15/26* (2013.01); *F16B 7/149* (2013.01); *F16B 7/1409* (2013.01); *F16B 7/1418* (2013.01); *F16B 7/1463* (2013.01); *G05G 5/22* (2013.01); *F15B 2015/268* (2013.01); *F15B 2211/72* (2013.01); *F16B 47/00* (2013.01); *G05G 2700/08* (2013.01)

(58) Field of Classification Search
CPC ......... F04F 99/00; F15B 15/26; F15B 15/262; F15B 2015/268; F15B 2211/72; F16B 7/14; F16B 7/1409; F16B 7/1418; F16B 7/1445; F16B 7/1463; F16B 7/149; F16B 47/00; G05G 5/16; G05G 5/22; G05G 2700/08
See application file for complete search history.

(56) References Cited

U.S. PATENT DOCUMENTS

| 1,830,636 | A | * | 11/1931 | Bragg | ................... B60T 13/243 188/152 |
| 2,632,425 | A | * | 3/1953 | Grover | ............... B65H 63/0364 92/110 |
| 3,359,862 | A | | 12/1967 | Modrich | |
| 3,918,346 | A | | 11/1975 | Ziegler | |

(Continued)

FOREIGN PATENT DOCUMENTS

KR 10-0883882 2/2009

*Primary Examiner* — Logan Kraft
(74) *Attorney, Agent, or Firm* — Innovation Capital Law Group, LLP; Vic Lin (57) ABSTRACT

A device for locking a rod member is provided. The device includes a body section having a vertical hole therein, and a ring-type locking unit and a piston serially arranged along the hole, wherein the rod member is disposed in the hole to be axially movable through the locking unit and the piston. The locking unit may be a lock block including an outer ring having an inclined surface on one side thereof, thereby defining a wedge-type space, an inner ring coaxially disposed in one side of the outer ring and accommodating a pressurizing member interacting with the inclined surface, and a spring disposed in the other side of the outer ring so as to elastically connect the outer ring and the inner ring.

10 Claims, 10 Drawing Sheets

(56) References Cited

U.S. PATENT DOCUMENTS

| | | | |
|---|---|---|---|
| 3,941,141 A | | 3/1976 | Robert |
| 4,537,113 A | | 8/1985 | Stoll et al. |
| 4,890,541 A | | 1/1990 | Spooner |
| 4,981,069 A | | 1/1991 | Matsui |
| 5,216,942 A | | 6/1993 | Sendoykas |
| 5,302,062 A | * | 4/1994 | Baba ................ F16D 1/091 279/4.09 |
| 5,553,690 A | | 9/1996 | Takahashi |
| 5,761,984 A | | 6/1998 | Goellner et al. |
| 5,791,230 A | | 8/1998 | Goellner |
| 5,823,300 A | | 10/1998 | Higuchi |
| 6,178,870 B1 | | 1/2001 | Takahashi |
| 7,178,639 B2 | * | 2/2007 | Schmalenbach ...... F15B 15/262 188/170 |
| 9,458,865 B2 | * | 10/2016 | Yokota ................ B25B 5/061 |

\* cited by examiner

DEVICE FOR LOCKING ROD MEMBER USING LOCK BLOCK

BACKGROUND OF THE INVENTION

Field of the Invention

The present invention generally relates to a device for releasably locking an axially movable rod member.

Description of the Related Art

Figure 1:
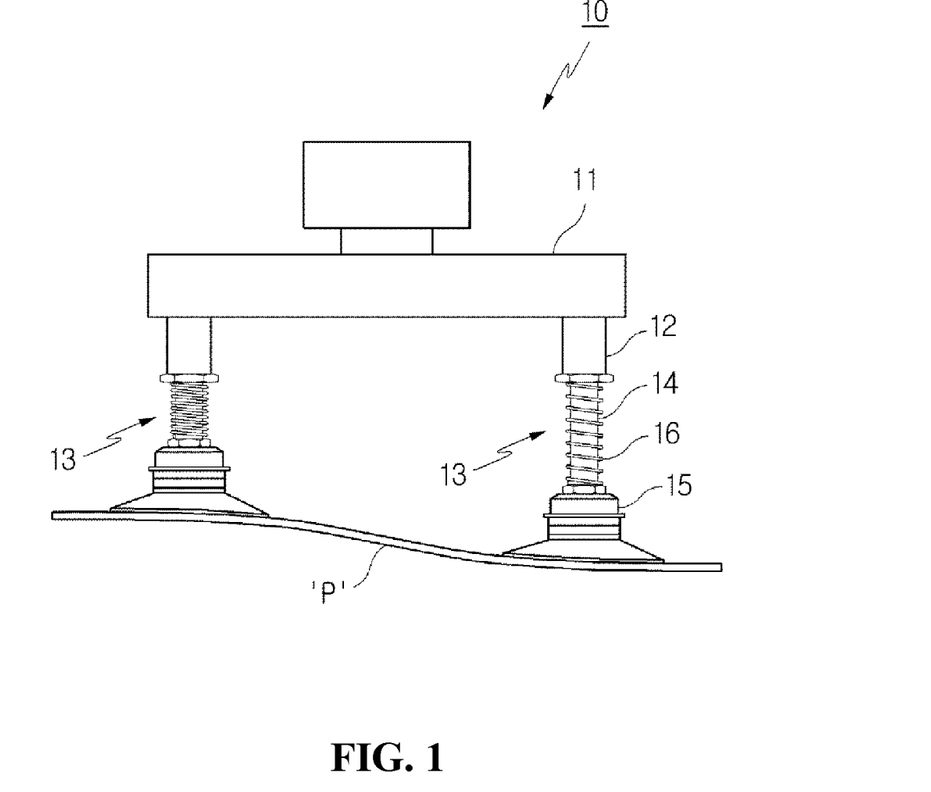
FIG. 1 is a view showing a conventional level compensator.

FIG. 1 shows a suction device that is adapted to a conventional vacuum transfer system. The suction device 10 includes a plurality of level compensators 13 connected to a vacuum chamber 11, wherein the level compensator 13 includes a pipe-type rod member 14, one end of which is inserted into a connection part 12, a suction pad 15 coupled to the other end of the rod member 14, and a spring 16 coaxially disposed around the rod member 14 and connected between the connection part 12 and the suction pad 15.

In this configuration, the rod member 14 is axially movable so that respective suction pads 15 can be brought into close contact with the surface of an object P in a high degree even when the surface is generally uneven. However, there is a problem in that the rod member 14 is still in a movable state when the object has been lifted. Accordingly, in this situation, a device for locking the rod member 14 is required.

Figure 2:
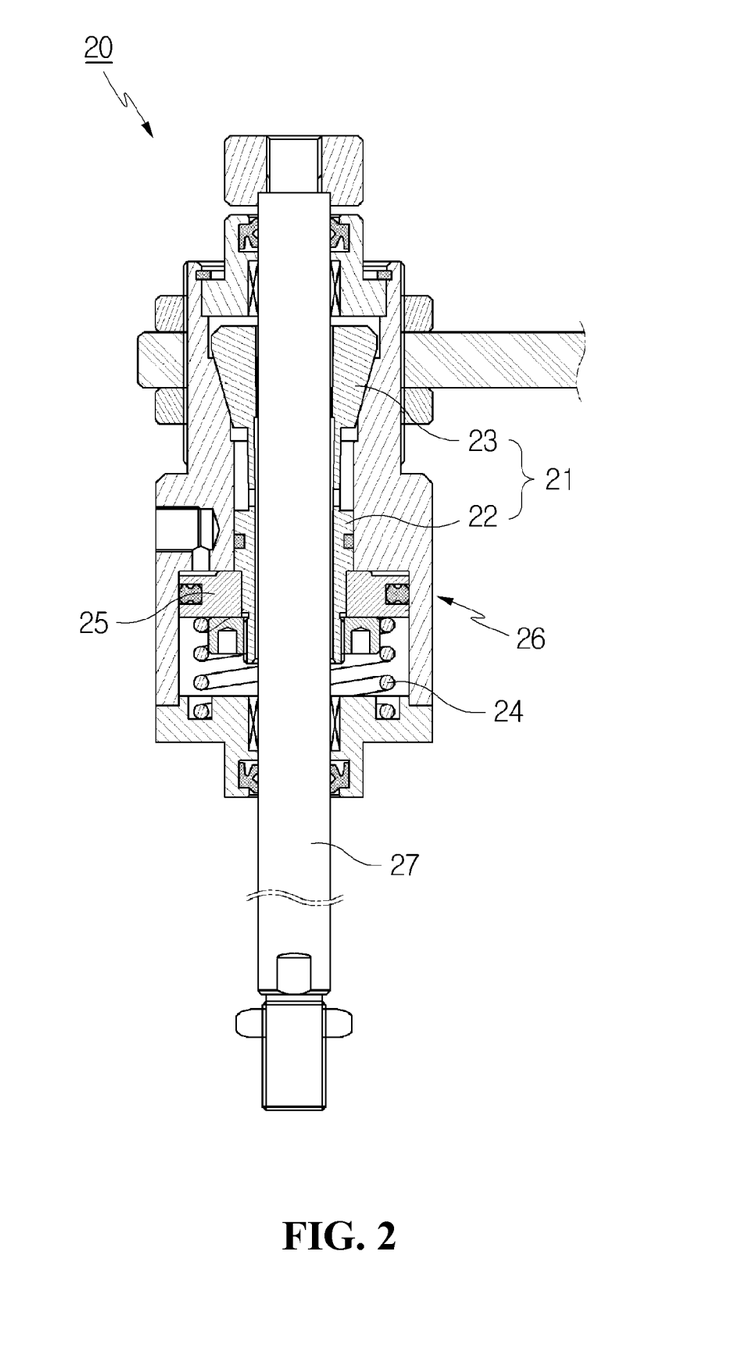
FIG. 2 is a view showing a device for locking a rod member according to the related art.

For example, FIG. 2 shows an air-locking device for a rod member that is disclosed in Korean Patent No. 10-0883882. The device 20 is a device that uses a so called chuck structure as a locking means. Here, the chuck structure 21 includes a cylinder body 22 inserted around a rod member 27 and a plurality of jaws 23 disposed upwards from the cylinder body 22. The chuck structure is configured such that as the cylinder body 22 slides along the rod member with the actuation of a piston 25 or a spring 24, which is provided below the cylinder body 22, the jaws 23 lock the rod member 27 with the compression by an inner wall of a housing 26 surrounding the jaws.

The locking device 20 is useful in an aspect of enabling the rod member 27 to be locked and unlocked. However, it also has problems primarily in that: due to its sliding mechanism, (1) there is severe friction and abrasion among surface-contacted locking elements, i.e. among housing 26-chuck structure 21-rod member 27, (2) accordingly, smooth locking of the rod member 27 cannot be obtained, and the like.

Figure 3:
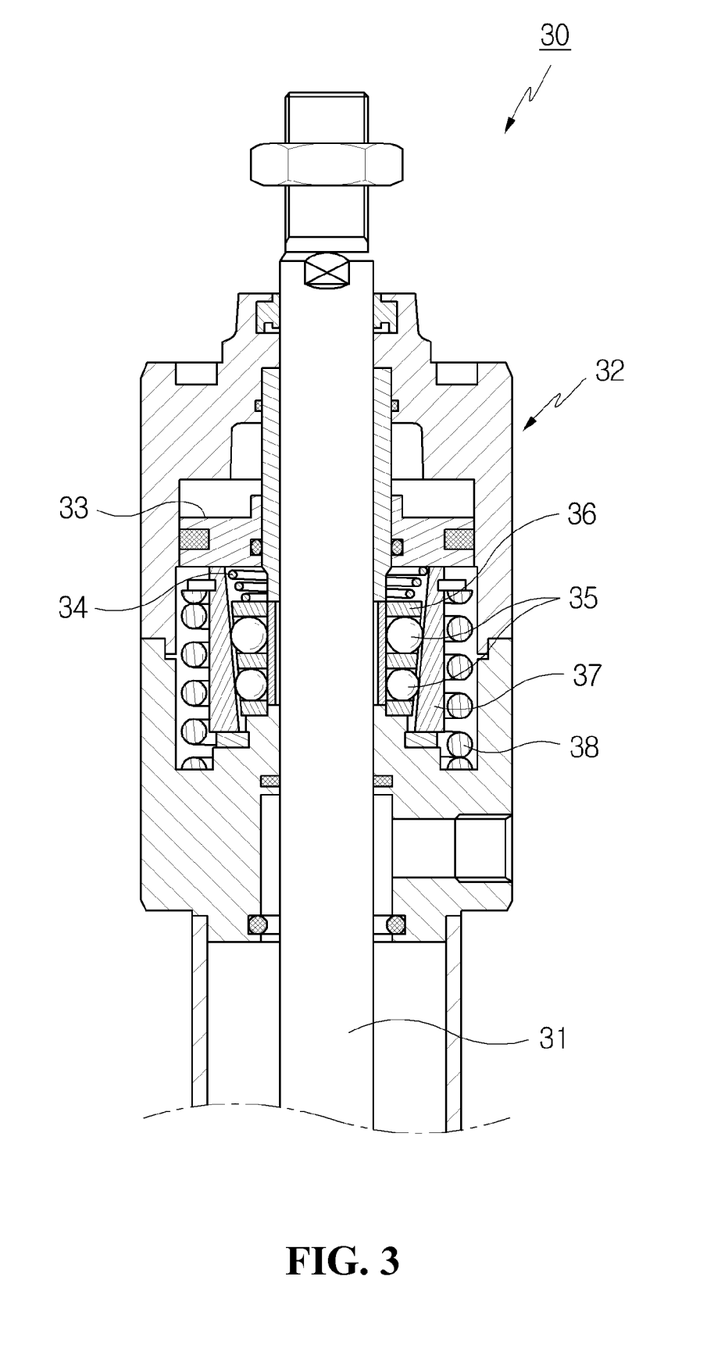
FIG. 3 is a view showing another device for locking a rod member according to the related art.

As another example, FIG. 3 shows a lock mechanism disclosed in U.S. Pat. No. 6,178,870. This mechanism 30 is a so called wedge-type mechanism that includes: in an internal space of a housing 32 surrounding a rod member 31, a reciprocating piston 33;

a ball 35-retainer 36 supported by an inner spring 34 on one side of the piston 33;

an inclined ring 37 coaxially disposed around the retainer 36 and supported by one side of the piston 33 via contact therewith; and an outer spring 38 coaxially disposed around the inclined ring 37 while coming into contact with an inner wall of a housing 32 surrounding the outer spring, thereby elastically supporting the movement of the inclined ring 37 by the piston 33.

This mechanism 30 may solve the problems of the above-mentioned sliding-type locking device in that the rod member 31 is locked by the compression of the ball 35 by a wedge member 36 and 37. However, this mechanism also has problems in that it has a complicated structure, so proper arrangement and assembly of respective elements are difficult.

That is, in order to configure the mechanism 30, locking elements, i.e. the retainer 36, the inner spring 34, the inclined ring 37, and the outer spring 38 should be sequentially arranged and assembled in position about the piston 33. However, the mechanism has problems as follows:

(1) the configuration is complicated;

(2) it is very difficult even for a skilled person to accurately and quickly assemble the respective elements 33 to 38 within a defined space of the housing 32; and (3) even upon disassembly, treatment of respective elements 33 to 38 is very troublesome and inconvenient.

Further, in the mechanism 30, the retainer 36 should be moved within a predetermined range for locking or unlocking of the rod member 31. However, this motion is obtained by the following configurations:

that the retainer 36 and the inclined ring 37 are respectively assembled based on the piston 33;

that the retainer 36 is separately supported by the inner spring 34;

that an inner surface of the inclined ring 37 is inclined; and that the outer spring 38 supporting the inclined ring 37 is disposed around the inclined ring 37 and supported by the inner wall of the housing 32 via contact therewith.

Thus, locking operation is not stably performed due to such complicated configurations.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-0883882
(Patent Document 2) U.S. Pat. No. 6,178,870

SUMMARY OF THE INVENTION

Accordingly, the present invention has been made keeping in mind the above problems occurring in the related art, and an object of the present invention is to provide a device for locking a rod member, having a lock block together with a wedge-type mechanism, thereby providing a simple configuration while enabling easy assembly and disassembly.

Another object of the present invention is to provide a device for locking a rod member and maintaining the locking action in a stable manner.

In order to achieve the above objects, according to one aspect of the present invention, a device for locking a rod member is provided. The device includes a body section having a vertical hole therein, and a ring-type locking unit and a piston serially arranged in the hole, wherein the rod member is disposed in the hole to be axially movable through the locking unit and the piston.

The locking unit may be a lock block as a locking module assembly including:

an outer ring having an inclined surface on one side thereof, thereby defining a wedge-type space therearound;

an inner ring coaxially disposed in one side of the outer ring and accommodating a pressurizing member interacting with the inclined surface; and a spring disposed in the other side of the outer ring so as to elastically connect the outer ring and the inner ring.

In this configuration, when the piston is actuated, the outer ring of the lock block is moved so that the inclined surface engages with and disengages from the pressurizing member so as to allow for the pressurizing member to engage with and disengages from the surface of the rod member, enabling the rod member to be locked or unlocked.

Preferably, the pressuring member is a ball, a roller or a ring.

The piston and the lock block are provided in a pair with respect to a single unit of rod member, and preferably, the piston and the lock block in a pair are designed such that they commonly use a compressed air-supply passage formed at a central portion thereof.

According to the present invention, the locking elements including the outer ring, the inner ring, the pressurizing member, and the spring are integrated and modulated into a lock block, so that they can be assembled and disassembled at one time. Thus, the device of the present invention has a simple structure and is easily assembled and disassembled, compared to that of the related art.

Unlike a conventional lock structure in which a retainer and an inclined ring are assembled and supported by the provision of a piston, according to the lock block, the outer ring and the inner ring are directly connected in the outer ring via the spring, enabling the rod member to be stably locked.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

These and other features and effects of a device for locking a rod member (also referred to as a 'locking device') will be apparent from the description of embodiments with reference to the accompanying drawings. In respective embodiments, like numbers refer to functionally identical elements.

Figure 4:
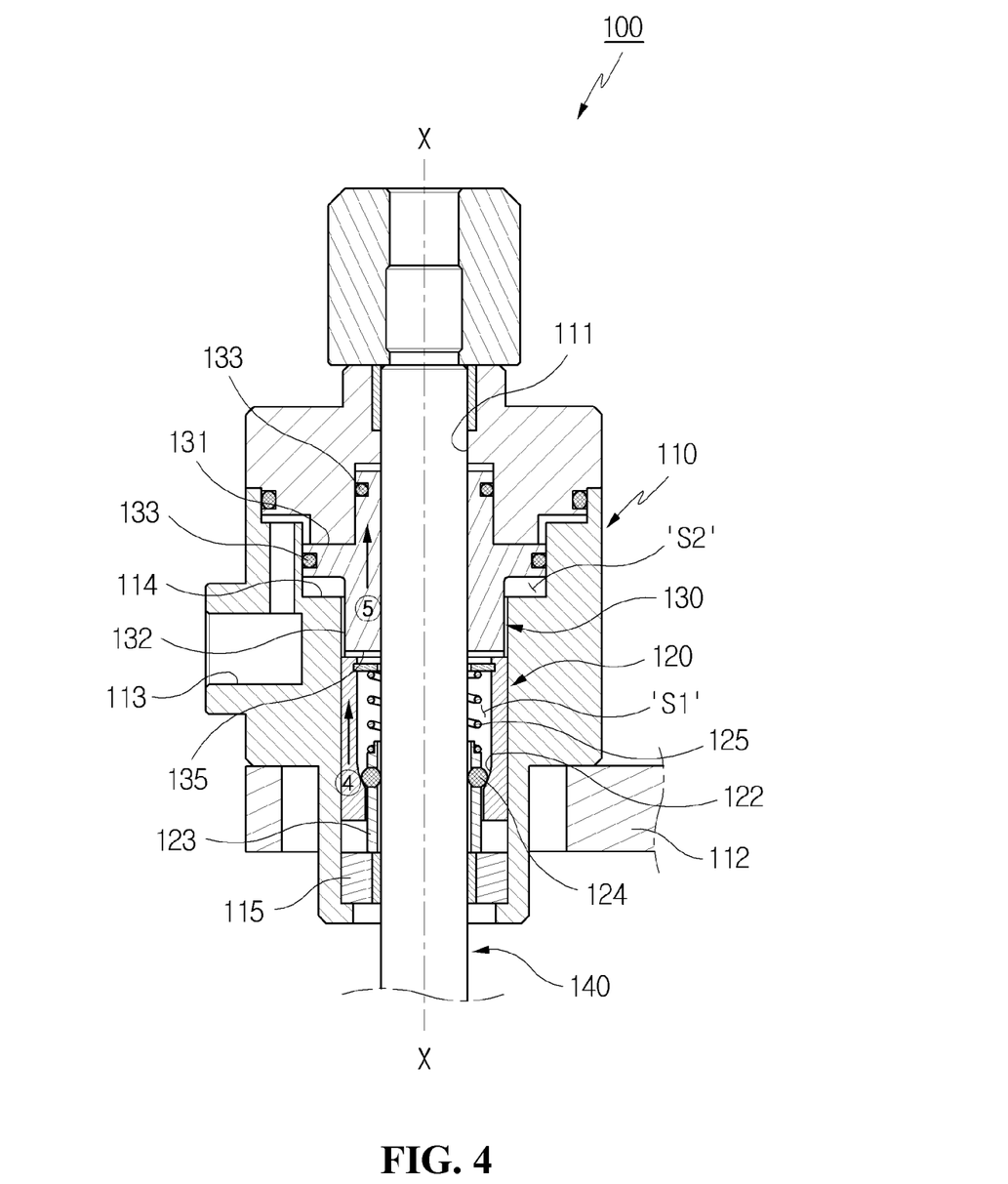
FIG. 4 is a cross-sectional view of a device for locking a rod member according to an embodiment of the present invention.

Referring to FIG. 4, the locking device is denoted as 100. The locking device 100 includes a body section 110 having a vertical hole 111 therein, and a ring-type lock block 120 and a piston 130 serially arranged in the hole 111, wherein a rod member 140 is disposed in the hole to be axially (X-Y) movable through the lock block 120 and the piston 130.

The above-mentioned elements 110, 120, 130, and 140 will be described in detail with reference to FIGS. 4 to 7.

The body section 110 having the central vertical throughhole 111 is connected to a robot system via a bracket 112 or a holder. The body section 110 has a fluid passage 113 that passes through an outer wall thereof to the hole 111. The fluid passage 113 extends to one side 131 of the piston 130 so that the piston 130 can move with the pressure of compressed air supplied through the fluid passage 113.

While the body section 110 is illustrated to be a 3-piece member including a closing part 115, it may have other configurations provided that it adequately contains the lock block 120 and the piston 130. Reference number '114' denotes an engaging step that is formed on an inner wall of the body section 110 to restrict a motion range of the piston 130.

Figure 5:
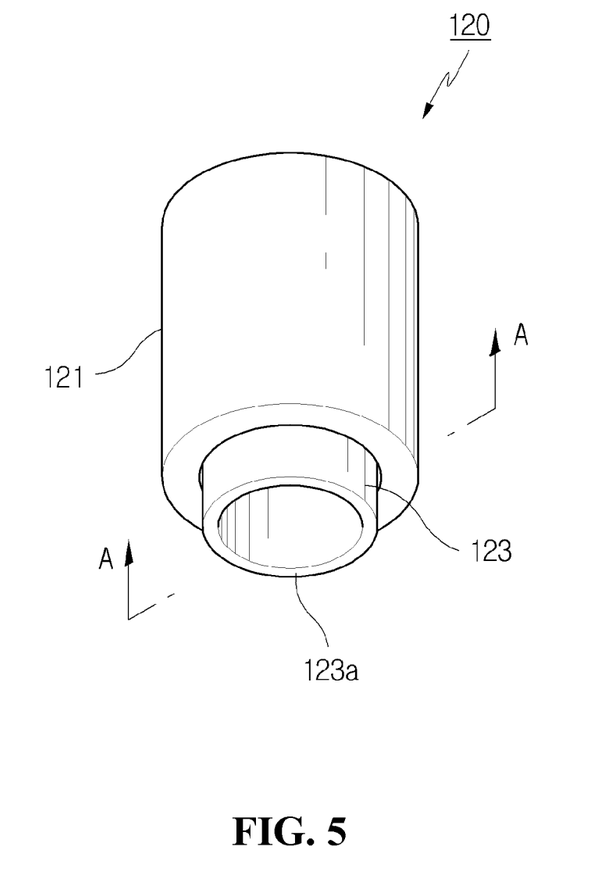
FIG. 5 is a perspective view of a lock block adapted to FIG. 4.
Figure 6:
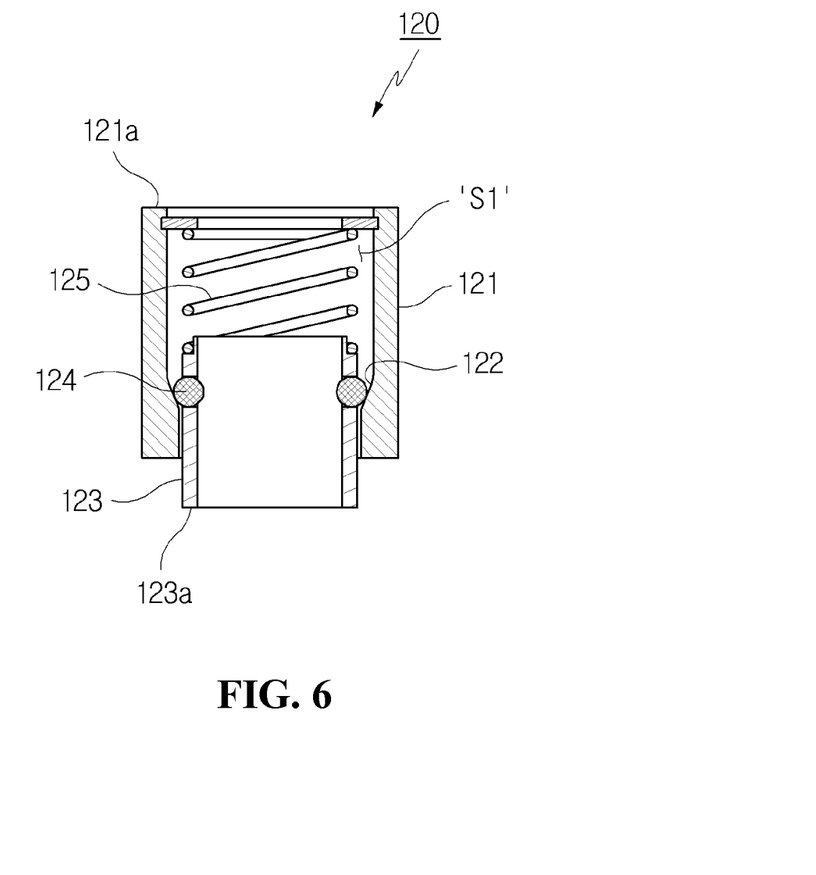
FIG. 6 is a cross-sectional view taken along line A-A OF FIG. 5.

The lock block 120 is a standardized module including elements for locking a rod member 140.

The lock block 120 includes:

an outer ring 121 having an inclined surface 122 on one side thereof, thereby defining a wedge-type space S1 therearound;

an inner ring 123 coaxially disposed in one side of the outer ring and accommodating a pressurizing member 124 interacting with the inclined surface 122; and a spring 125 disposed in the other side of the outer ring 121 so as to elastically connect the outer ring 121 and the inner ring 123.

Of course, the outer ring 121 and the inner ring 123 are coaxially disposed while having different diameters. Here, an upper end 121a of the outer ring 121 protrudes further from an upper end of the inner ring 123, and a lower end 123a of the inner ring 123 protrudes further from a lower end of the outer ring 121. Such a configuration about the ends 121a and 123a is considered optimal for securing the fixation of the inner ring 123 and the mobility of the outer ring 121 in the body section 110.

In the present embodiment, the pressurizing member 124 is a ball that is accommodated in a partially-protruded manner in a receiving groove of the inner ring 123. Alternatively, the pressurizing member 124 may be a roller or a ring in other embodiments. The pressurizing member 124 is positioned in the space S1 of the lock block 120, and is configured to engage with and disengage from the inclined surface 122 as the outer ring 121 moves in an axial direction.

The lock block 120 is a single module including various locking elements, i.e. the outer ring 121, the inner ring 123, the pressurizing member 124, and the spring 125. The lock block is inserted into the hole 111 of the body section 110 or around the rod member 140. Here, the lower end 123a of the inner ring 123 is fixedly engaged with the lower closing end 115 of the body section 110. Also, the piston 130 is provided, confronting the upper end 121a of the outer ring 121.

Figure 7:
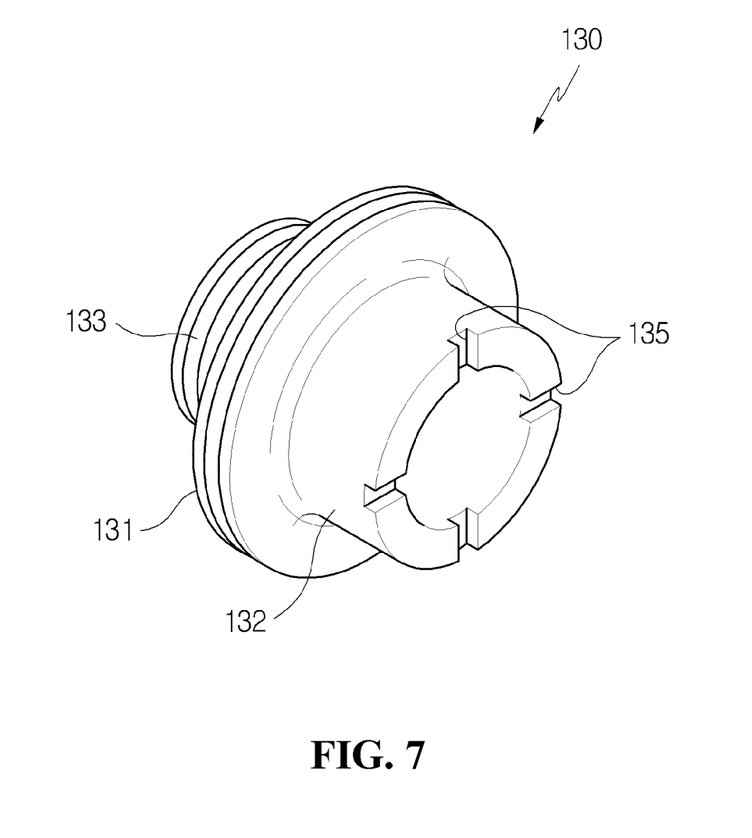
FIG. 7 is a perspective view of a piston adapted to FIG. 4.

The piston 130 is installed to be axially (X-Y) movable along the rod member 140. The motion range is restricted by the engaging step 114 of the inner wall of the body section 110. The piston 130 moves within a predetermined range with the pressure of compressed air supplied from the outside to the inside of the hole 111 through the fluid passage 113, and thus pushes the outer ring 121 of the lock block 120.

Specifically, one side 131 of the piston 130 on the side of the fluid passage 131 is a flange-type surface, and the other side 132 of the piston on the side of the lock block 120 is a projection narrower than the former side 131 and is in contact with the end 121a of the outer ring 121. During movement, the flange-type surface 131 engages with the engaging step 114. This structure is effective to improve the mobility and stability of the piston and response to the outer ring 121. However, the present invention is not limited to the shape of the piston 130.

The lock block 120 is operated by the movement of the piston 130. However, when air fills or vacuum is formed in e.g. a space S2 between the piston 130 and the engaging step 114, the piston may be difficult to move due to air pressure. Thus, an air passage 135 is formed on the other side 132 of the piston 130 on the side of the lock block 120 in order to enable the space S2 between the piston 130 and the body section 110 and the internal space S1 of the lock block 120 to communicate with each other.

In the figures, the passage 135 is a groove formed on the other side 132 of the piston 130. That is, while the other side 132 of the piston on the side of the lock block 120 and the end 121a of the outer ring 121 are surface-contacted, the space S2 communicates with the outside and the space S1 of the lock block 120 via the passage 135. While the passage 135 is illustrated to be a groove, it may be modified into other shapes such as a hole or the like.

The piston 130 is provided with a packing 133. Here, the packing 133 is provided on the surface of the piston 130 so as to seal the piston 130 from the body section 110. This configuration ensures free movement of the rod member 140 and durability of the packing 133, relative to a conventional configuration in which the packing is provided on the rod member 140. Particularly, this configuration enables the locking device 100 of the present invention to be adequately used even in a fine dust environment.

The rod member 140 is axially (X-Y) movable through the lock block 120 and the piston 130. The rod member may have a variety of shapes, but may be a pipe-type member provided that the locking device 100 of the present invention is proposed to be adapted to a rod member (14 in FIG. 1) of the level compensator commonly used to a conventional vacuum transfer system.

According to the structure of the locking device 100, as the piston 130 moves to move the outer ring 121 of the lock block 120, the pressurizing member 124 engages with or disengages from the inclined surface 122 depending on the moving direction of the outer ring, thereby enabling the rod member 140 to be locked and unlocked by the lock block 120. Here, the moving direction of the piston 130 and the resulting locking and unlocking of the rod member 140 are determined whether compressed air is supplied or not.

In the present embodiment, when compressed air is supplied, the piston 130 is thus moved in one direction, resulting in the rod member 140 being unlocked, and when compressed air is not supplied, the piston 130 is thus moved in opposite direction due to tension of the spring 125, resulting in the rod member 140 being locked. However, alternatively, in other embodiments, the locking of the rod member 140 may depend on a supply of the compressed air, and the unlocking of the rod member may depend on the tension of the spring 125. This is possible by adequately changing positions of the fluid passage 113, the spring 125 or the inclined surface.

Figure 8:
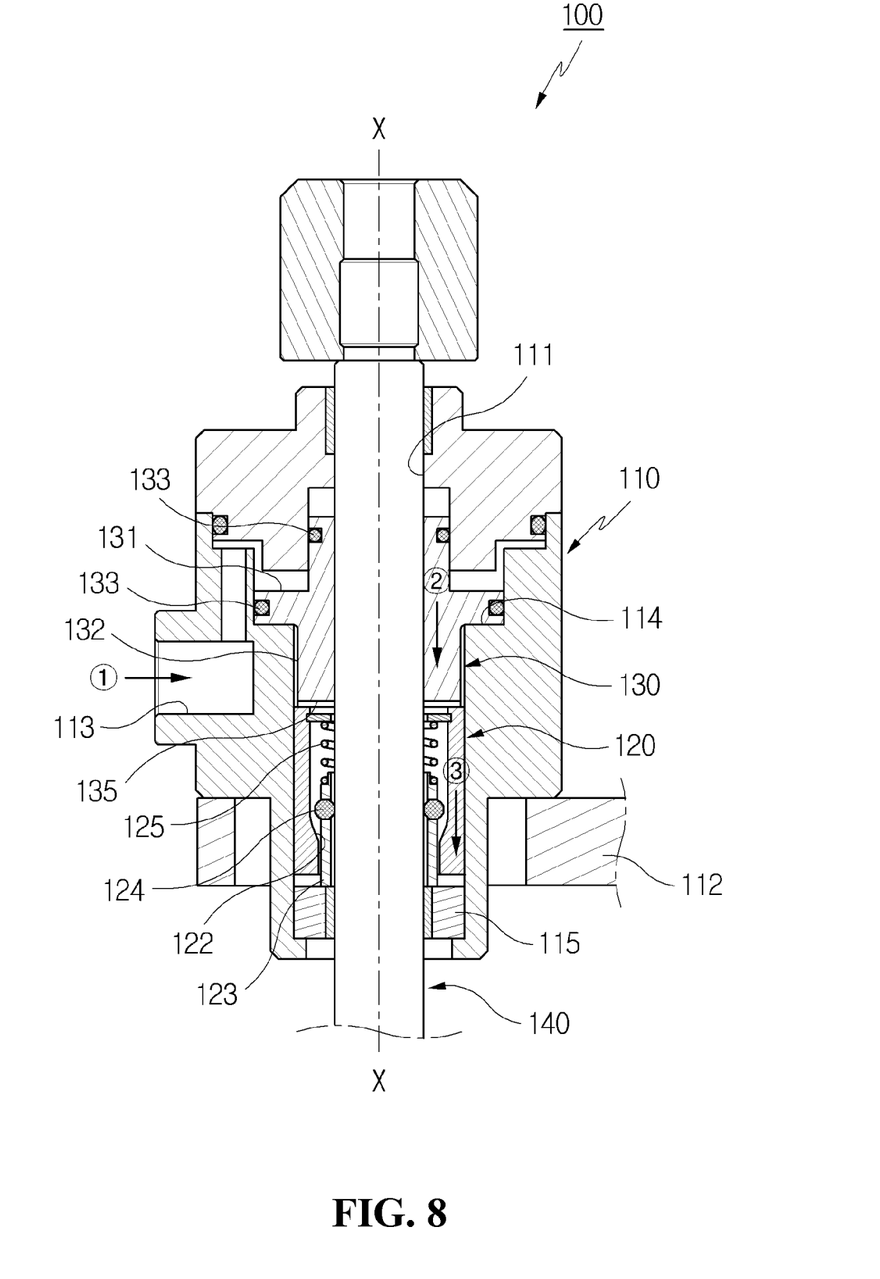
FIG. 8 is a view showing the operation of the device of FIG. 4.

Referring to FIG. 8, when high speed compressed air is supplied towards one side 131 of the piston 130 through the fluid passage 113 (see the arrow 1), the piston 130 moves downwards to the engaging step 114 (see the arrow 2) so as to push down (see the arrow 3) the end 121a of the outer ring 121 of the lock block 120. Here, the pressurizing member 124 becomes disengaged from the inclined surface 122 and is positioned in a free state in the space S1 of the outer ring 121.

In this unlocked state, the rod member 140 is freely movable in an axial direction (X-Y).

When the supply of the compressed air is interrupted in this state, the locking device 100 returns to the state of FIG. 4. That is, outer ring 121 moves upwards (see the arrow 4) from the fixed inner ring 123 to the original position with the tension of the spring 125. Of course, the piston 130 also moves to the original position (see the arrow 5) as the outer ring 121 moves. In this process, the pressurizing member 124 comes into contact with the inclined surface 122 and is thus pushed inwards and engages with the surface of the rod member 140 positioned inwards therefrom.

In this locked state, it is impossible for the rod member 140 to move axially (X-Y). Of course, when compressed air is supplied, the rod member 140 is in a movable state of FIG. 8 again. Thus, the level of the rod member 140 can be adequately regulated by supplying compressed air and interrupting the supply of the compressed air.

In the above embodiment, the locking device 100 is a device using a single lock block 120. However, only with a single lock block, locking force may be insufficient. In this case, a plurality of lock blocks may be required. Here, when serially arranged, a great number of lock blocks may be adapted. In this case, however, respective lock blocks may be provided with individual fluid passages.

Figure 9:
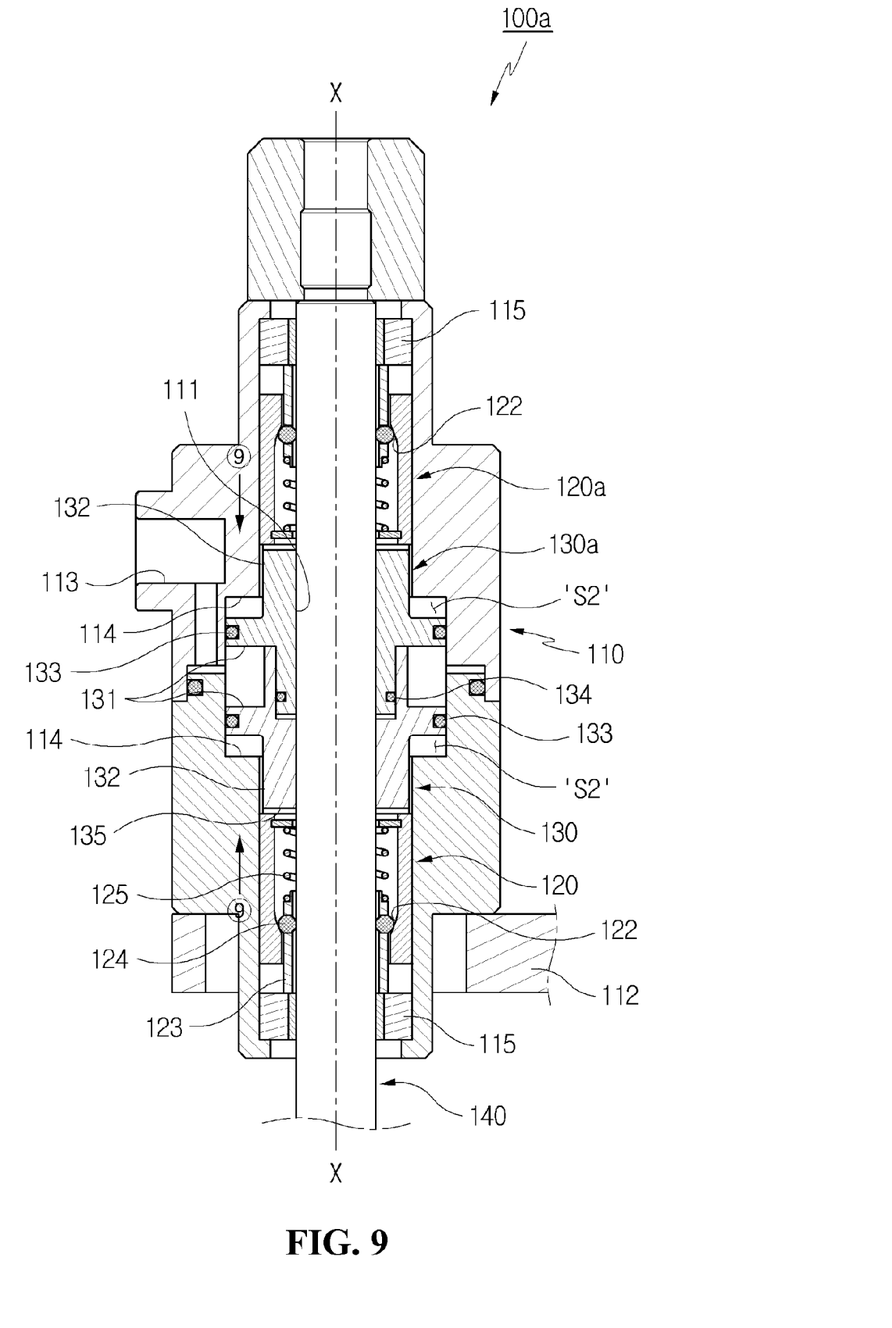
FIG. 9 is a view showing a device for locking a rod member according to another embodiment of the present invention.

Referring to FIG. 9, a locking device 100a according to another embodiment of the present invention is provided. The locking device 100a is symmetrically provided on opposite sides thereof with two pairs of pistons 120 and 130a and lock blocks 120 and 120a with respect to a single rod member 140. Here, respective pair of piston 130 or 130a and lock block 120 or 120a is designed to commonly use a centrally formed compressed air-passage 113.

That is, compressed air is simultaneously supplied to both pistons 130 and 130a through a single fluid passage 113.

Here, respective pistons 130 and 130a and respective lock blocks 120 and 120a have functionally the same elements, so a detailed description of the piston 130a and the lock block 120a is omitted. Both pistons 130 and 130a overlap with each other at opposite ends thereof, and a piston packing 134 is provided on the overlapped portion. As in the packing 133, this configuration is effective to improve the durability and sealability of the packing.

Figure 10:
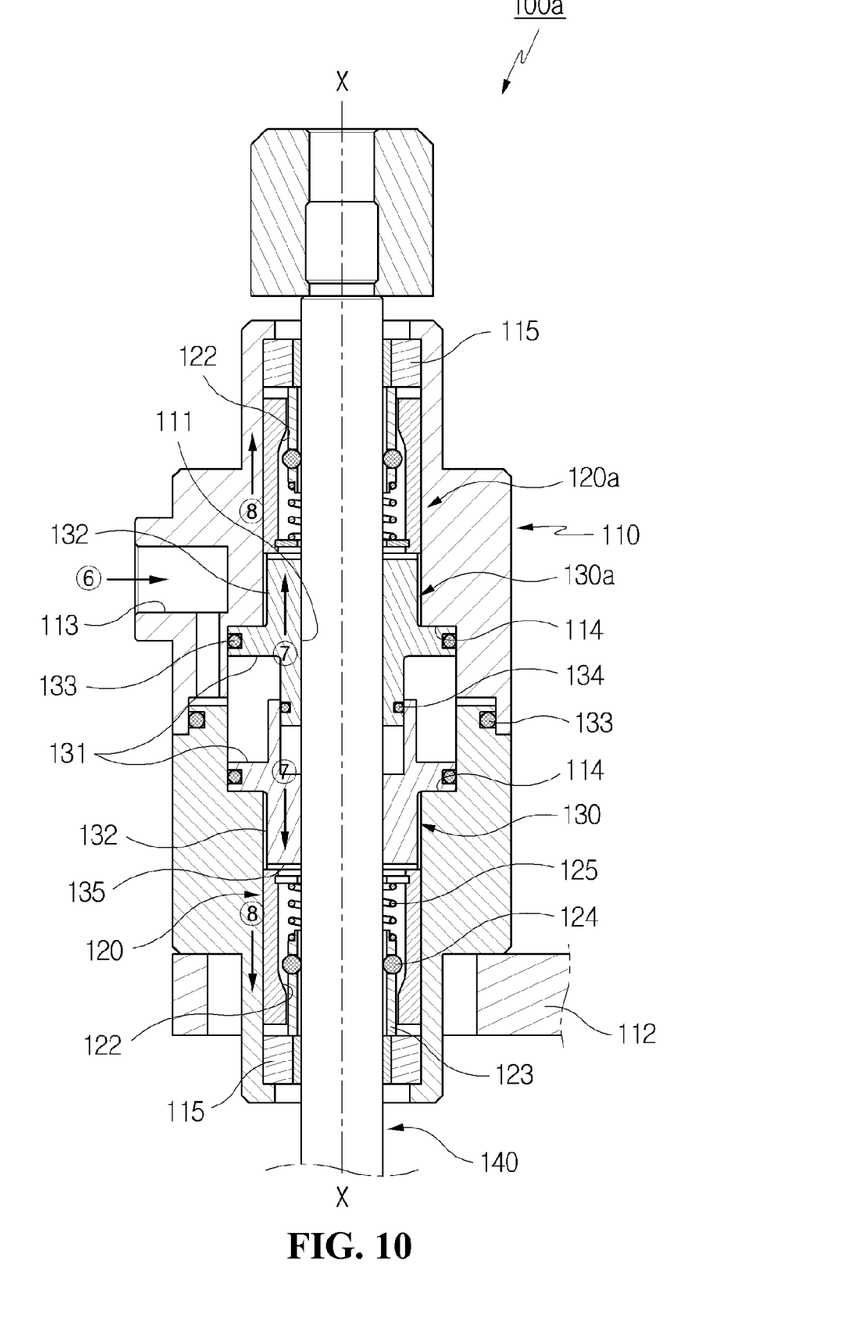
FIG. 10 is a view showing the operation of the device of FIG. 9.

Referring to FIG. 10, when high speed compressed air is supplied towards one sides 131 of the opposite pistons 130 and 130a through the fluid passage 113 (see the arrow 6), the pistons 130 and 130a move upwards or downwards (see the arrow 7) so as to push up or down (see the arrow 8) the outer ring 121 of the lock blocks 120 and 120a. Here, the pressurizing members 124 of the respective lock blocks 120 and 120a become disengaged from the inclined surfaces 122 and are positioned in a free state in the spaces S1 of the outer rings 121.

In this unlocked state, the rod member 140 is freely movable in an axial direction (X-Y).

When the supply of the compressed air is interrupted in this state, the locking device 100a returns to the state of FIG. 9. That is, the outer rings 121 move (see the arrow 9) to the original position with the tension of the springs 125. Of course, the pistons 130 also move to the original position as the outer rings 121 move. In this process, the pressurizing members 124 come into contact with the inclined surfaces 122 and are thus pushed inwards and engage with the surface of the rod member 140 positioned inwards therefrom.

In this locked state, it is impossible for the rod member 140 to move axially (X-Y). Particularly, in the present embodiment, two lock blocks 120 and 120a are symmetrically disposed on upper and lower sides in order to lock the rod member. Thus, the locking device 100a is very suitable for use when bi-directional locking or high locking force is required.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for locking a rod member, the device comprising: a body section (110) having a vertical hole (111) therein, and first and second ring-type locking units and first and second pistons (130, 130a) serially arranged in the hole, wherein the rod member (140) is disposed in the hole to be axially (X-Y) movable through the locking unit and the piston,
wherein each of the ring-type locking units is a module assembly as a first or second lock block (120, 120a) comprising:
an outer ring (121) having an inclined surface (122) on one side thereof, thereby defining a wedge-type space (S1) therearound;
an inner ring (123) coaxially disposed in one side of the outer ring (121) and accommodating a pressurizing member (124) interacting with the inclined surface (122); and
a spring (125) disposed in the other side of the outer ring (121) so as to elastically connect the outer ring (121) and the inner ring (123),
wherein the rod member (140) is locked and unlocked in such a manner that, when the first and second pistons (130, 130a) move so that the outer ring (121) is moved, the inclined surface (122) engages with and disengages from the pressurizing member (124), enabling the pressurizing member (124) to engage with and disengage from the surface of the rod member (140),
wherein the first piston (130) and lock block (120), and the second piston (130a) and lock block (120a) are symmetrically disposed on opposite sides with respect to one rod member (140), and
wherein the first and second pistons (130) and (130a) overlap with each other at opposite closing ends thereof, and a piston packing (134) is provided on the overlapped portion so as to seal the pistons (130) and (130a) from each other.

2. The device according to claim 1, wherein the body section (110) has a fluid passage (113) passing through an outer wall thereof to the hole (111), and wherein the first and second pistons (130, 130a) are actuated with pressure of compressed air to be supplied into the hole (111) through the fluid passage (113).

3. The device according to claim 1, wherein the pressurizing member (124) is a ball, a roller or a ring.

4. The device according to claim 1, wherein the first and second lock blocks (120, 120a) are installed in the hole (111) of the body section (110) such that a lower end (123a) of the inner ring (123) is fixedly engaged with a lower closing end (115) of the body section (110), and each of the pistons (130, 130a) is provided, confronting an upper end (121a) of the outer ring (121).

5. The device according to claim 1, wherein the body section (110) has a fluid passage (113) passing through an outer wall thereof to the hole (111),
wherein the first and second pistons (130, 130a) are actuated with pressure of compressed air to be supplied into the hole (111) through the fluid passage (113), and
wherein one side (131) of each of the pistons (130, 130a) facing the fluid passage (113) is a flange-type surface, and the other side (132) of each of the pistons facing the lock block (120) is a projection narrower than the flange of the one side (131) and is in contact with an end (121a) of the outer ring (121).

6. The device according to claim 5, wherein the body section (110) is provided on an inner wall thereof with an engaging step (114) to restrict a motion range of the first and second pistons (130, 130a) while interacting with the side (131) having the flange-type surface, and
wherein the pistons (130, 130a) are provided on the other side (132) with an air passage (135) enabling a space (S2) between the pistons (130, 130a) and the engaging step (114) to communicate with the space (S1) of the lock blocks (120, 120a).

7. The device according to claim 6, wherein the air passage (135) is a groove formed on an end surface on the side (132) of the piston (130) being in contact with the outer ring (121).

8. The device according to claim 1, wherein the first and second pistons (130, 130a) are provided on the surface thereof with a packing (133) so as to seal the piston (130) from a portion of inner wall of the body section (110).

9. The device according to claim 1, wherein the body section (110) has a fluid passage (113) passing through an outer wall thereof to the hole (111),
wherein the first and second pistons (130 and 130a) are actuated with pressure of compressed air to be supplied into the hole (111) through the fluid passage (113), and
wherein the first piston (130) and lock block (120) and the second piston (130a) and lock block (120a) are configured to commonly use the fluid passage (113) formed at the central portion thereof.

10. The device according to claim 1, wherein the rod member (140) is a pipe-type rod member.

* * * * *